A. M. LAYCOCK.
BRAKE BAND SUPPORT.
APPLICATION FILED JAN. 8, 1917.
1,326,748.
Patented Dec. 30, 1919.
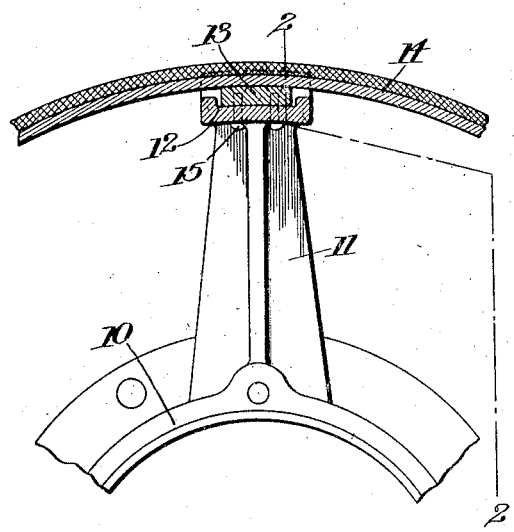
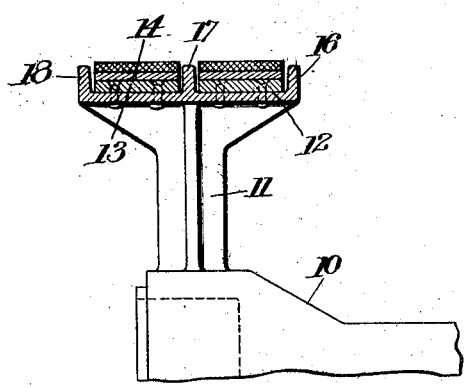
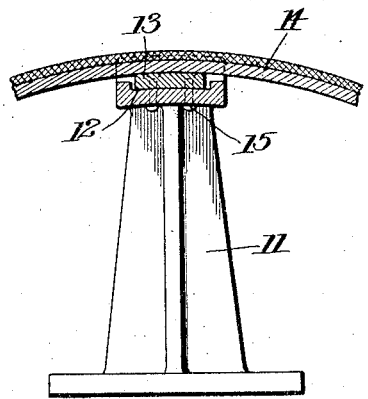
Inventor
Arthur M. Laycock

UNITED STATES PATENT OFFICE.

ARTHUR M. LAYCOCK, OF KINGSTON, PENNSYLVANIA.

BRAKE-BAND SUPPORT.

1,326,748.     Specification of Letters Patent.     Patented Dec. 30, 1919.

Application filed January 8, 1917. Serial No. 141,305.

*To all whom it may concern:*

Be it known that I, ARTHUR M. LAYCOCK, formerly a subject of the King of Great Britain, but having taken out my first naturalization papers in the United States, residing at Kingston, Luzerne county, State of Pennsylvania, have invented certain new and useful Improvements in Brake-Band Supports, of which the following is a specification.

This invention relates to means for supporting the brake band from the axle housing in motor vehicles and similar devices. The purpose of the invention is to so support the brake band as to securely and properly hold it in position while at the same time preventing the noise and rattle which often occurs in the use of the brakes. The novel features of the invention will be apparent from the following description taken in connection with the drawing in which, Figure 1 is a view partly in section through a portion of the brake band and support;

Fig. 2 is a similar view taken on the line 2—2 of Fig. 1; and

Fig. 3 is a view corresponding to Fig. 1 showing a modified construction in which the standard is made as a separate article.

As is well known, the brake bands in motor vehicles are ordinarily supported by brackets carried by the axle housing, the bands resting on the outer ends of those brackets which are ordinarily made of metal. There is some movement between the band and the end of the bracket and this ordinarily results in rattling. It is the purpose of the present invention to provide means for preventing this rattling.

As shown in the drawings, 10 represents the axle housing on which is mounted the bracket 11 which may be formed integrally with the housing, as shown in Fig. 1.

The upper or outer end of this bracket is made with a socket or depression 12 in its face and in this depression or socket I place the soft brake pad 13 so as to support the brake band 14 on its under smooth flat surface. The soft brake pad is held in place by any suitable means, as for instance by the members 15.

The bracket 11 has along its margins the outwardly projecting flanges 16, 17. In case the outer end of the bracket is made in double form to receive two sections of brake bands, as shown in Fig. 2, there is a flange 18 to coöperate with the flange 17 for holding one of the bands in proper position. I find that this construction properly supports the brake band in position and at the same time avoids the noise and rattle which might otherwise occur.

Having described the invention what is claimed is:

1. In a brake mechanism, the combination with a brake band of a fixed metal standard for supporting said band on its inner side having side flanges for holding said band in place against lateral movement and a soft pad between said flanges against which the inner side of said brake band rests.

2. In a brake mechanism, the combination with a brake band of a fixed metal standard for supporting said band on its inner side having a socket in its outer end and a soft pad in said socket bearing against said brake band, and means for holding said pad in place.

3. In a brake mechanism, the combination with a brake band of a fixed metal standard for supporting said band on the inner side, said standard having a socket in its outer end and side flanges between which said brake band fits, a soft pad fitting in said socket and against the inner side of said brake band, and means for holding said pad to said standard in said socket.

In testimony whereof I affix my signature.

ARTHUR M. LAYCOCK.